(12) United States Patent
Morozumi et al.

(10) Patent No.: US 12,021,273 B2
(45) Date of Patent: Jun. 25, 2024

(54) METHOD FOR PRODUCING SEPARATOR FOR FUEL CELLS

(71) Applicant: TOYOTA SHATAI KABUSHIKI KAISHA, Kariya (JP)

(72) Inventors: Eiichiro Morozumi, Kariya (JP); Takayuki Suzuki, Kariya (JP); Michi Hashiba, Kariya (JP)

(73) Assignee: TOYOTA SHATAI KABUSHIKI KAISHA, Kariya (JP)

( * ) Notice: Subject to any disclaimer, the term of this patent is extended or adjusted under 35 U.S.C. 154(b) by 246 days.

(21) Appl. No.: 17/634,900

(22) PCT Filed: Aug. 18, 2020

(86) PCT No.: PCT/JP2020/031116
§ 371 (c)(1),
(2) Date: Feb. 11, 2022

(87) PCT Pub. No.: WO2021/095312
PCT Pub. Date: May 20, 2021

(65) Prior Publication Data
US 2022/0328849 A1 Oct. 13, 2022

(30) Foreign Application Priority Data
Nov. 11, 2019 (JP) ................. 2019-203746

(51) Int. Cl.
*H01M 8/0206* (2016.01)
*H01M 8/0213* (2016.01)
*H01M 8/0221* (2016.01)

(52) U.S. Cl.
CPC ....... *H01M 8/0206* (2013.01); *H01M 8/0213* (2013.01); *H01M 8/0221* (2013.01)

(58) Field of Classification Search
CPC . H01M 8/0206; H01M 8/0213; H01M 8/0221
See application file for complete search history.

(56) References Cited

U.S. PATENT DOCUMENTS

| 2006/0280992 A1 | 12/2006 | Miyagawa |
| 2009/0214926 A1 | 8/2009 | Watanabe et al. |

(Continued)

FOREIGN PATENT DOCUMENTS

| CN | 110277566 A | 9/2019 |
| JP | 2009-224294 A | 10/2009 |

(Continued)

OTHER PUBLICATIONS

JP Office Action in Application No. 2019-203746 Dated Sep. 27, 2022.

(Continued)

*Primary Examiner* — Sarah A. Slifka
(74) *Attorney, Agent, or Firm* — Maschoff Brennan

(57) ABSTRACT

A separator includes a base including projections. The base is made of a metal plate. The separator includes a conductive layer arranged on a top surface of each of the projections of the base. The conductive layer includes conductive carbon materials, conductive particles, and a thermosetting resin. The conductive carbon materials and the conductive particles are dispersed in the resin and are in contact with each other over an entirety of the conductive layer in a thickness direction of the conductive layer.

4 Claims, 7 Drawing Sheets

(56) References Cited

U.S. PATENT DOCUMENTS

| | | | |
|---|---|---|---|
| 2015/0295252 A1 | 10/2015 | Watanabe et al. | |
| 2018/0069248 A1 | 3/2018 | Suzuki et al. | |
| 2019/0288299 A1 | 9/2019 | Morozumi et al. | |

FOREIGN PATENT DOCUMENTS

| | | | |
|---|---|---|---|
| JP | 2009-230880 A | 10/2009 | |
| JP | 2010-065257 A | 3/2010 | |
| JP | 2012209265 A | 10/2012 | |
| JP | 2018-052048 A | 4/2018 | |
| JP | 2019-075336 A | 5/2019 | |
| WO | 2005/027248 A1 | 3/2005 | |
| WO | 2017/038165 A1 | 3/2017 | |

OTHER PUBLICATIONS

CN Office Action dated Dec. 29, 2023 as received in Application No. 202080056814.0.

METHOD FOR PRODUCING SEPARATOR FOR FUEL CELLS

TECHNICAL FIELD

The present invention relates to a method for producing the separator for the fuel cell.

BACKGROUND ART

Polymer electrolyte fuel cells include a stack in which cells are stacked (see, for example, Patent Literature 1). Each cell includes a power generation portion and two metal separators. The power generation portion includes a membrane electrode assembly. The separators hold the power generation portion. The separators each include projections and recesses that are alternately provided. In each cell, gas passages are defined by the projections and the recesses between the separators and the power generation portion. Fuel gas and oxidizing gas are supplied through the gas passages. Each separator includes a base having a surface opposing the power generation portion. This surface includes a conductive layer, which has conductivity, in contact with the power generation portion. The conductive layer reduces the contact resistance between the separator and the power generation portion.

CITATION LIST

Patent Literature

Patent Literature 1: Japanese Laid-Open Patent Publication No. 2010-65257

SUMMARY OF INVENTION

Technical Problem

To improve the performance of the fuel cell, it is desired that the contact resistance between the separator and the power generation portion be further reduced.

It is an objective of the present invention to provide a method for producing the separator for the fuel cell.

Solution to Problem

To achieve the above-described objective, the present invention provides a method for producing a separator for a fuel cell. The separator for the fuel cell includes a base including projections. The base is made of a metal plate. The separator for the fuel cell includes a conductive layer including conductive carbon materials, conductive particles, and a thermosetting resin. The conductive layer is arranged on a top surface of each of the projections of the base such that the conductive layer is in contact with a power generation portion of the fuel cell. The method includes applying a conductive paint to a film to form a thermal transfer sheet. The conductive paint is produced by dispersing the conductive carbon materials and the conductive particles in an entirety of the resin. The method includes pressurizing the thermal transfer sheet against the base and heating the thermal transfer sheet with the thermal transfer sheet in contact with each of the top surfaces of the projections, thereby thermally transferring the conductive paint to the each of the top surfaces of the projections and forming the conductive layer on the each of the top surfaces of the projections.

DESCRIPTION OF EMBODIMENTS

First Embodiment

Figure 1:
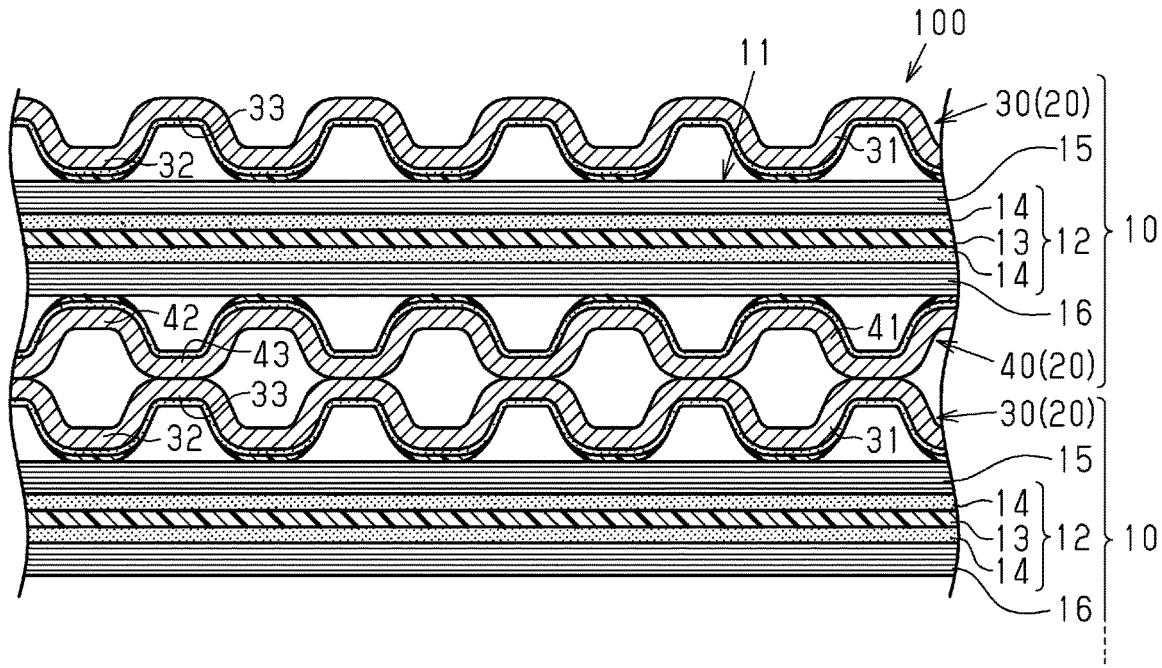
FIG. 1 is an enlarged cross-sectional view of a separator for a fuel cell, a method for producing the separator for the fuel cell, and a method for producing a thermal transfer sheet according to a first embodiment, mainly showing a cell including the separator.

A separator for a fuel cell, a method for producing the separator for the fuel cell, and a method for producing a thermal transfer sheet according to a first embodiment will now be described with reference to FIGS. 1 to 9. For illustrative purposes, the components in the drawings may be partially exaggerated or simplified, and the dimension of each part may be shown in a ratio that differs from an actual ratio.

As shown in FIG. 1, a separator for a fuel cell (hereinafter referred to as the separator 20) is used for a stack 100 of a polymer electrolyte fuel cell. The separator 20 is a collective term for a first separator 30 and a second separator 40, which will be described later. In the stack 100, cells 10 are stacked. The cells 10 each include a power generation portion 11 having a membrane electrode assembly 12. The membrane electrode assembly 12 is held by the first separator 30 and the second separator 40.

An anode-side gas diffusion layer 15, which includes carbon fibers, is arranged between the membrane electrode assembly 12 and the first separator 30. A cathode-side gas diffusion layer 16, which includes carbon fibers, is arranged between the membrane electrode assembly 12 and the second separator 40. The membrane electrode assembly 12 includes an electrolyte membrane 13 and two catalytic electrode layers 14 that hold the electrolyte membrane 13. The electrolyte membrane 13 is made of a solid polymer material that has an excellent proton conductivity in a wet state. Each catalytic electrode layer 14 supports a catalyst, such as platinum, in order to expedite the electrochemical reaction of reactant gas in the fuel cell.

The first separator 30 includes a base 31 made of a metal plate. The base 31 is made of, for example, stainless steel. The base 31 includes first projections 32 and first recesses 33. The first projections 32 and the first recesses 33 extend in a surface direction of the base 31 (i.e., a direction that is orthogonal to the sheet of FIG. 1) and are alternately arranged. Each first projection 32 is in contact with the power generation portion 11, more specifically, in contact with the anode-side gas diffusion layer 15.

The second separator 40 includes a base 41 made of a metal plate. The base 41 is made of, for example, stainless steel. The base 41 includes second projections 42 and second recesses 43. The second projections 42 and the second recesses 43 extend in a surface direction of the base 41 (i.e., a direction that is orthogonal to the sheet of FIG. 1) and are alternately arranged. Each second projection 42 is in contact with the power generation portion 11, more specifically, in contact with the cathode-side gas diffusion layer 16.

The section defined by a portion of the first separator 30 corresponding to each first recess 33 and the anode-side gas diffusion layer 15 is a gas passage through which fuel gas (e.g., hydrogen gas) flows. The section defined by a portion of the second separator 40 corresponding to each second recess 43 and the cathode-side gas diffusion layer 16 is a gas passage through which air (e.g., oxidizing gas) flows.

The bottom of each first recess 33 of the first separator 30 and the bottom of the corresponding second recess 43 of the second separator 40, which is adjacent to the first separator 30, are joined to each other through, for example, laser welding. The section defined by a portion of the first separator 30 corresponding to the rear surface of each first projection 32 and a portion of the second separator 40 corresponding to the rear surface of the corresponding second projection 42 is a cooling passage through which coolant flows.

Figure 2:
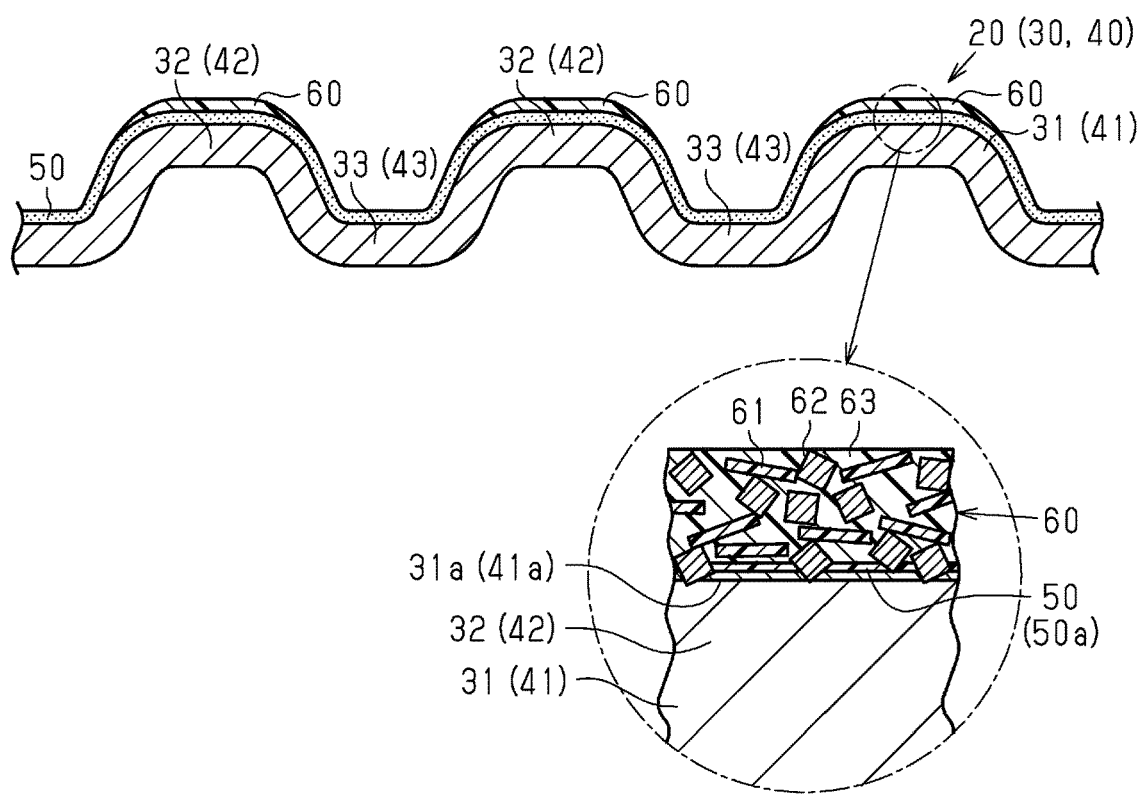
FIG. 2 is a cross-sectional view of the separator.

As shown in FIG. 2, a resin layer 50 is arranged on the entirety of a first front surface of each of the bases 31, 41 in the separator 20. The first front surface opposes the power generation portion 11. The resin layer 50 is not arranged on a second front surface of each of the bases 31, 41 that is opposite from the first front surface. The resin layer 50 includes a thermosetting resin 50a, such as epoxy resin. The resin 50a is an example of a second resin. Further, a conductive layer 60, which has conductivity, is arranged on each of the top surfaces of the projections 32, 42 of the bases 31, 41 with the resin layer 50 located between the conductive layer 60 and the top surface. Each conductive layer 60 includes conductive carbon materials 61, conductive particles 62, a thermosetting resin 63, and a solvent. The resin 63 is an example of a first resin.

The conductive carbon materials 61 are, for example, graphite particles. The conductive particles 62 are, for example, titanium nitrides. The resin 63 is, for example, epoxy resin. The solvent is, for example, methyl ethyl ketone (MEK). The hardness of titanium nitride is higher than the hardness of oxide films 31a, 41a that are arranged on the front surfaces of the bases 31, 41.

The conductive carbon materials 61 and the conductive particles 62 are dispersed in the resin 63 and are in contact with each other over the entirety of the conductive layer 60 in a thickness direction of the conductive layer 60. The conductive particles 62 extend through the oxide films 31a, 41a, which are arranged on the front surfaces of the projections 32, 42, to contact the bases 31, 41. Thus, in the separators 30, 40, conductive passages that do not go through the oxide films 31a, 41a are defined by the bases 31, 41, the conductive carbon materials 61, and the conductive particles 62.

The method for producing the first separator 30 will now be described. The method for producing the second separator 40 is the same as the method for producing the first separator 30 and thus will not be described.

Figure 3:
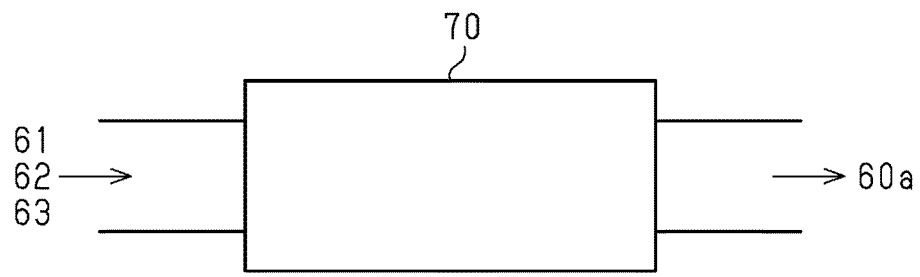
FIG. 3 is a schematic diagram showing a step of producing a conductive paint.

Referring to FIG. 3, the conductive particles 62, the resin 63, the solvent, and the raw materials of the conductive carbon materials 61 are first injected into a grinding device 70 (e.g., jet mill). The raw materials of the conductive carbon materials 61 are ground, and the ground conductive carbon materials 61, the conductive particles 62, the resin 63, and the solvent are mixed. This produces a conductive paint 60a. In the conductive paint 60a, the ground conductive carbon materials 61 and the conductive particles 62 are dispersed in the resin 63.

Figure 4:
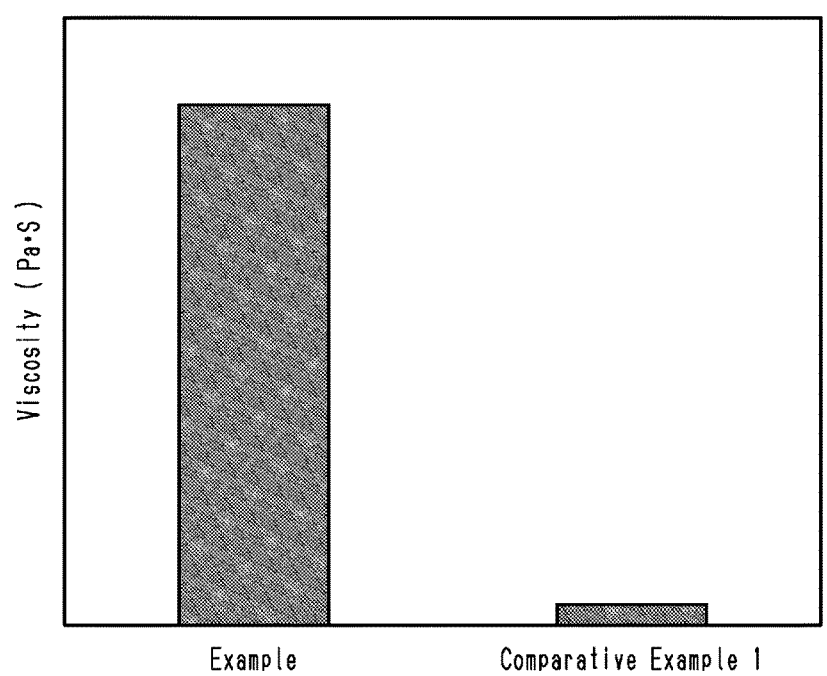
FIG. 4 is a graph showing the result of measuring the viscosity in the conductive paint in an example and a conductive paint of comparative example 1.

The result of measuring the viscosity of the conductive paint 60a will now be described with reference to FIG. 4. The conductive paint 60a of the first embodiment was used as an example, and a conductive paint containing titanium nitride and epoxy resin was used as comparative example 1. The viscosity of each example was measured. FIG. 4 reveals that the viscosity of the example is larger than the viscosity of comparative example 1. This is presumably because the ground raw materials of the conductive carbon materials 61 are dispersed in the resin 63.

Figure 5:
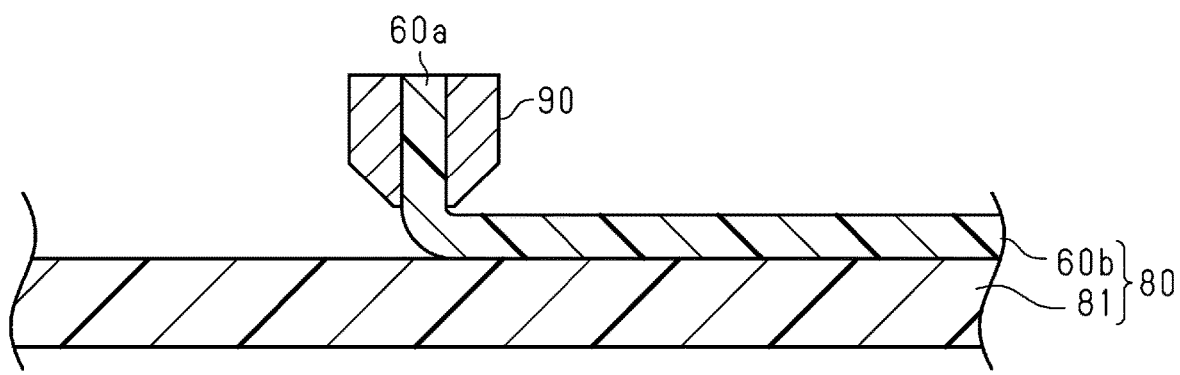
FIG. 5 is a cross-sectional view of a film to which the conductive paint is applied.

Next, as shown in FIG. 5, a coater 90 is used to apply the conductive paint 60a to one surface of a resin (e.g., polyethylene terephthalate) film 81. This forms a conductive film 60b on the surface of the film 81. A thermal transfer sheet 80 is thus produced.

Figure 6:
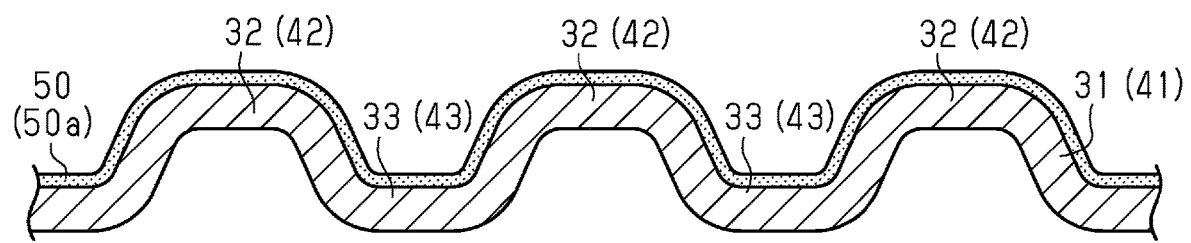
FIG. 6 is a cross-sectional view of the base on which the resin layer is formed.
Figure 7:
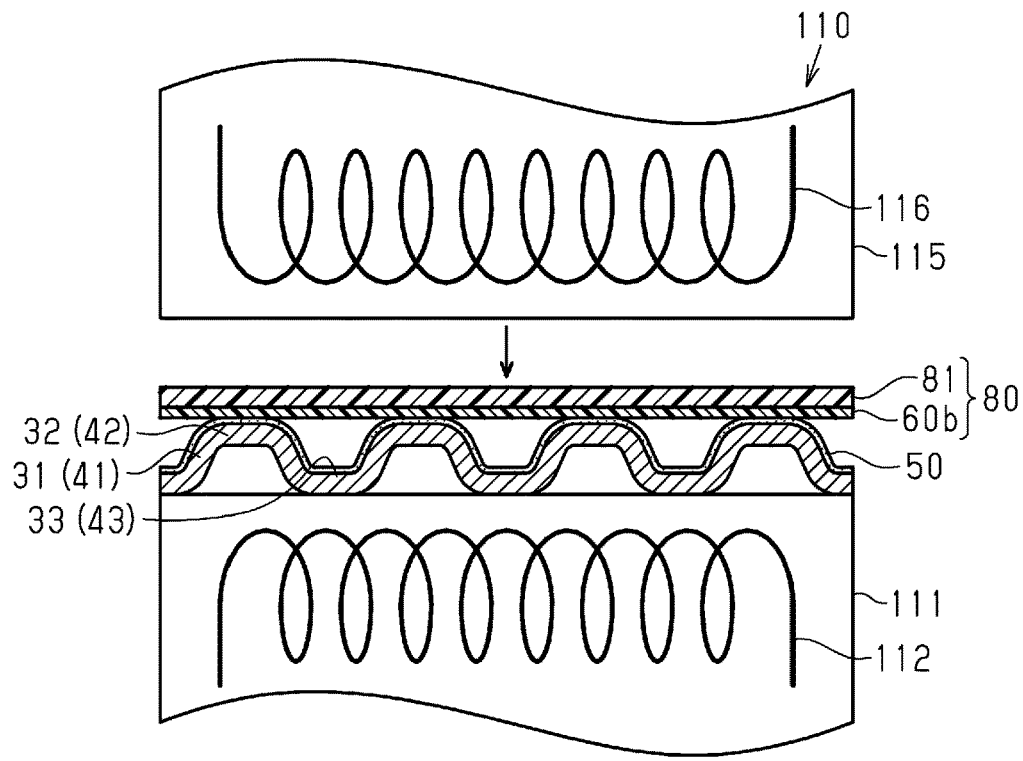
FIG. 7 is a cross-sectional view showing a state in which the thermal transfer sheet is mounted on the base.

Then, as shown in FIG. 6, a spray or the like is used to spray a resin material onto the entire first front surface of the base 31. This forms the resin layer 50, including the resin 50a. Subsequently, as shown in FIG. 7, the base 31 is mounted on a fixed die 111 of a thermal transfer apparatus 110 with the first front surface directed upward. Further, the thermal transfer sheet 80 is mounted on the first projections 32 of the base 31 with the conductive film 60b directed downward.

Figure 8:
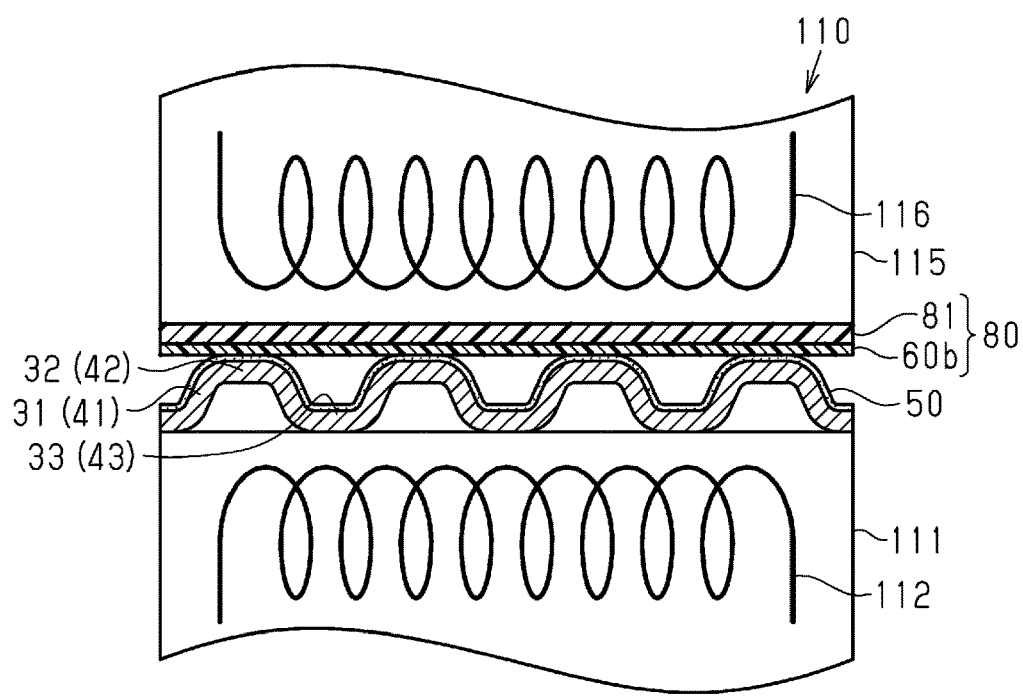
FIG. 8 is a cross-sectional view showing a state in which the conductive film is thermally transferred to the base.

Afterwards, as shown in FIG. 8, a movable die 115 is lowered toward the fixed die 111. The fixed die 111 and the movable die 115 are used to pressurize the base 31 and the thermal transfer sheet 80. This causes the conductive particles 62 to extend through the resin layer 50 and the oxide film 31a of the base 31 and contact the base 31 as shown in FIG. 2.

Next, as shown in FIG. 8, power is supplied to electrically-heated wires 112, 116 that are respectively arranged on the fixed die 111 and the movable die 115. The base 31 is heated to a given temperature that is higher than the thermosetting temperature of each of the resin 63 and the resin 50a, which are epoxy resins. This causes the resin layer 50 to be thermally cured and causes the conductive film 60b to be thermally transferred to the top surfaces of the projections 32 of the base 31, thereby forming the conductive layer 60. Lastly, although not shown in the drawings, the movable die 115 is separated from the fixed die 111 to remove the first separator 30 from the thermal transfer apparatus 110. The first separator 30 is thus produced.

The result of measuring the contact resistance in the conductive layer 60 will now be described with reference to FIG. 9. The result of measuring the contact resistance in the conductive layer 60 of the first embodiment, which was used as the example, the conductive layer of comparative example 1, the conductive layer of comparative example 2, and the conductive layer of comparative example 3 will now be described.

First, the structures of comparative examples 1 to 3 will be described. Comparative example 1 includes titanium nitride and epoxy resin. Comparative example 2 includes graphite particles and epoxy resin. Comparative example 3 includes a first layer and a second layer. The first layer is arranged on each of the front surfaces of the bases 31, 41 and includes titanium nitride and epoxy resin. The second layer is arranged on the front surface of the first layer and includes graphite particles and epoxy resin.

The contact resistance in each example was measured as follows. First, two carbon clothes were used to hold test pieces of the bases 31, 41 in which the front surfaces of the bases 31, 41 included conductive layers. Next, in this state, while a jig was used to apply a given load to the test pieces, a given amount of current was supplied to the test pieces. The voltages during the application of the current were measured to obtain the contact resistance in each example. The carbon clothes are made of the same material as the anode-side gas diffusion layer 15 and the cathode-side gas diffusion layer 16.

Figure 9:
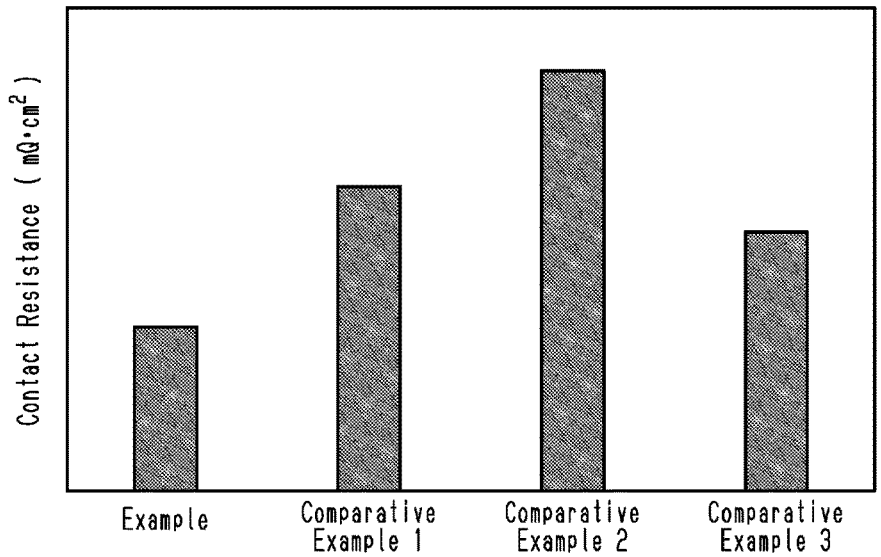
FIG. 9 is a graph showing the result of measuring the contact resistance in the conductive layer of the example, a conductive layer of comparative example 1, a conductive layer of comparative example 2, and a conductive layer of comparative example 3.

FIG. 9 reveals that the contact resistance in the example is lower than the contact resistances in comparative examples 1 to 3. As described above, comparative example 1 has a lower viscosity than the example. Thus, in the conductive layer of comparative example 1, it is presumed that when the titanium nitrides settle in the epoxy resin, the titanium nitrides are unevenly distributed in the thickness direction of the conductive layer.

In comparative example 2, it is presumed that conductive passages are defined by graphite particles, which have a smaller conductivity than titanium nitrides. In comparative example 3, the first layer includes titanium nitrides and the second layer includes graphite particles. Thus, it is presumed that conductive passages are defined by the titanium nitrides in the first layer and conductive passage are defined by the graphite particles in the second layer.

The example has a higher viscosity than comparative example 1. Thus, it is presumed that graphite particles (conductive carbon materials 61) and titanium nitrides (conductive particles 62) are easily dispersed in the epoxy resin (resin 63) over the entirety of the conductive layer 60 in the thickness direction. Thus, conductive passages going through the graphite particles (conductive carbon materials 61) and the titanium nitrides (conductive particles 62) are easily defined over the entirety of the conductive layer 60 in the thickness direction. Accordingly, it is presumed that the contact resistance in the example is lower than the contact resistances in comparative examples 1 to 3.

The operation of the first embodiment will now be described.

In the conductive layer 60, the conductive carbon materials 61 and the conductive particles 62 are dispersed in the resin 63 and are in contact with each other over the entirety of the conductive layer 60 in the thickness direction. Thus, conductive passages going through the conductive carbon materials 61 and the conductive particles 62 are defined in the conductive layer 60 in the thickness direction. This increases the conductivity of the conductive layer 60 (operation 1).

Further, in order to produce the conductive layer 60, the thermal transfer sheet 80 in which the conductive paint 60a is applied to the film 81 is used. The conductive carbon materials 61 and the conductive particles 62 are dispersed in the entirety of the resin 63. Thus, in the conductive layer 60 arranged on each of the projections 32, 42 of the bases 31, 41, the conductive carbon materials 61 and the conductive particles 62 are easily dispersed over the entirety of the conductive layer 60 in the thickness direction. Accordingly, conductive passages going through the conductive carbon materials 61 and the conductive particles 62 are easily defined in the conductive layer 60 (operation 2).

When the conductive paint 60a including the conductive carbon materials 61, the conductive particles 62, and the thermosetting resin 63 is applied to one surface of the film 81, the conductive particles 62 potentially settle downward (i.e., settle toward the film 81) due to the weights of the conductive particles 62. Thus, in the conductive paint 60a, the conductive carbon materials 61 that have been ground to become minute are dispersed in the entirety of the resin 63. Accordingly, the viscosity of the conductive paint 60a is higher than the viscosity of the conductive paint 60a that includes the conductive carbon materials 61 prior to being ground. This limits situations in which the conductive particles 62 settle toward the film 81 in the conductive paint 60a, which is applied to the surface of the film 81 (operation 3).

The advantages of the first embodiment will now be described.

(1) The separator 20 includes the bases 31, 41 and the conductive layers 60. The bases 31, 41 are made of a metal plate and respectively include the projections 32, 42. The conductive layers 60 are arranged on the top surfaces of the projections 32, 42 of the bases 31, 41. Each conductive layer 60 includes the conductive carbon materials 61, the conductive particles 62, and the thermosetting resin 63. The conductive carbon materials 61 and the conductive particles 62 are dispersed in the resin 63 and are in contact with each other over the entirety of the conductive layer 60 in the thickness direction. This structure provides operation 1 and thus reduces the contact resistance between the separator 20 and the power generation portion 11.

(2) To produce the separator 20, the thermal transfer sheet 80 is used. In the thermal transfer sheet 80, the conductive paint 60a is applied to the film 81 so that the conductive film 60b is formed on the film 81. The bases 31, 41 are pressurized and heated with the thermal transfer sheet 80 in contact with the top surfaces of the projections 32, 42. This causes the conductive film 60b to be thermally transferred to the top surfaces of the projections 32, 42 to form the conductive layers 60 on the top surfaces of the projections 32, 42. This method provides operation 2 and thus reduces the contact resistance between the separator 20 and the power generation portion 11.

(3) The raw materials of the conductive carbon materials 61 are ground, and the ground conductive carbon materials 61, the conductive particles 62, and the resin 63 are mixed. As a result, the conductive paint 60a is produced. This method provides operation 3 and thus easily produces the conductive paint 60a in which the ground conductive carbon materials 61 and the conductive particles 62 are dispersed in the entirety of the thermosetting resin 63. Accordingly, the thermal transfer sheet 80 in which the conductive paint 60a is applied to the film 81 is produced.

(4) Before the conductive film 60b is thermally transferred to each of the top surfaces of the projections 32, 42 to form the conductive layer 60, the resin layer 50 including the thermosetting resin 50a is formed on the entire first front surface of each of the bases 31, 41 opposing the power generation portion 11. In this method, the resin layer 50 is formed on the entire first front surface of each of the bases 31, 41 opposing the power generation portion 11, and the conductive layer 60 is then formed on each of the projections 32, 42 of the bases 31, 41. The resin 63, which is included in the conductive layer 60 and corresponds to the first resin, and the resin 50a, which is included in the resin layer 50 and corresponds to the second resin, are thermosetting resins. Thus, the resin 63 and the resin 50a are thermally cured by heating the bases 31, 41. The separator 20 is obtained in such a manner. In this structure, the entire first front surface of each of the bases 31, 41 opposing the power generation portion 11 is covered by the resin layer 50. This prevents the elution of ions from the first front surface of each of the bases 31, 41.

(5) To produce the thermal transfer sheet 80, the conductive paint 60a is applied to one surface of the film 81 to form the conductive film 60b on the surface of the film 81. The conductive paint 60a is produced by dispersing the conductive carbon materials 61 and the conductive particles 62 in the entirety of the thermosetting resin 63. This method provides an advantage similar to advantage (2).

Second Embodiment

A separator for a fuel cell, a method for producing the separator for the fuel cell, and a method for producing a thermal transfer sheet according to a second embodiment will now be described with reference to FIGS. 10 to 13. Differences from the first embodiment will be mainly described.

In the second embodiment, like or the same reference numerals are given to those components that are like or the same as the corresponding components of the first embodiment. Further, the components that correspond to those in the first embodiment are given reference numbers "2" obtained by adding 200 to reference numbers "" of the first embodiment and will not be described. For illustrative purposes, the components in the drawings may be partially exaggerated or simplified, and the dimension of each part may be shown in a ratio that differs from an actual ratio.

Figure 10:
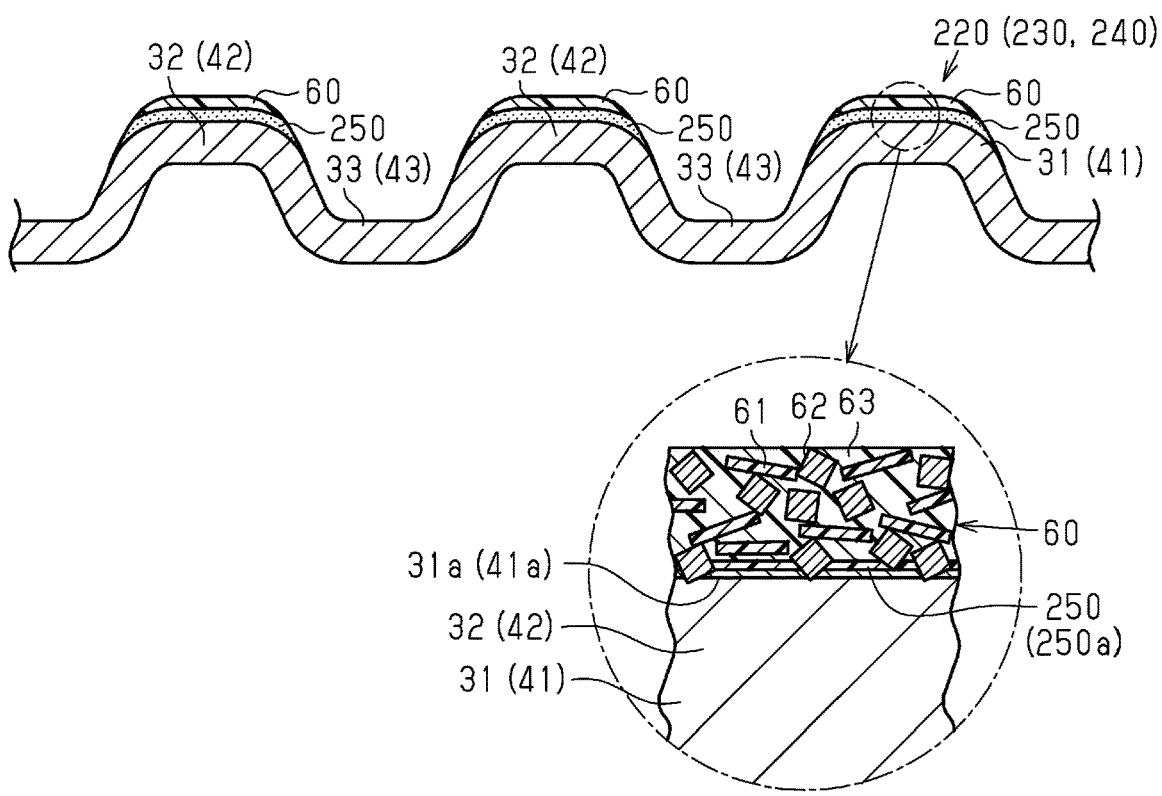
FIG. 10 is a cross-sectional view of a separator for a fuel cell, a method for producing the separator for the fuel cell, and a method for producing a thermal transfer sheet according to a second embodiment.

As shown in FIG. 10, a separator 220 includes a resin layer 250 arranged only on each top surface of the projections 32, 42 of the bases 31, 41. The bases 31, 41 of the second embodiment are made of, for example, titanium alloy. The resin layer 250 includes a thermosetting resin 250a, such as epoxy resin. The resin 250a is an example of the second resin. Further, the conductive layer 60 is arranged on each of the top surfaces of the projections 32, 42 of the bases 31, 41 with the resin layer 250 located between the conductive layer 60 and the top surface.

The method for producing a first separator 230 will now be described. The method for producing a second separator 240 is the same as the method for producing the first separator 230 and thus will not be described. The steps that are the same as those of the first embodiment will not be described.

Figure 11:
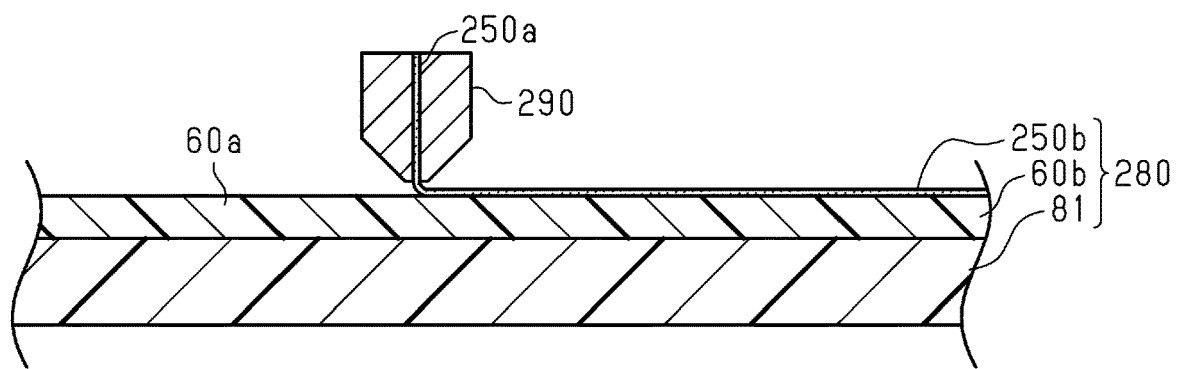
FIG. 11 is a cross-sectional view showing a state in which a resin paint is applied to the front surface of the conductive paint of the thermal transfer sheet.

As shown in FIG. 11, a coater 290 is used to apply the conductive paint 60a to one surface of the film 81 to form the conductive film 60b on the surface of the film 81. Next, a resin paint 250b including the resin 250a is applied to the front surface of the conductive film 60b. A thermal transfer sheet 280 is thus produced.

Figure 12:
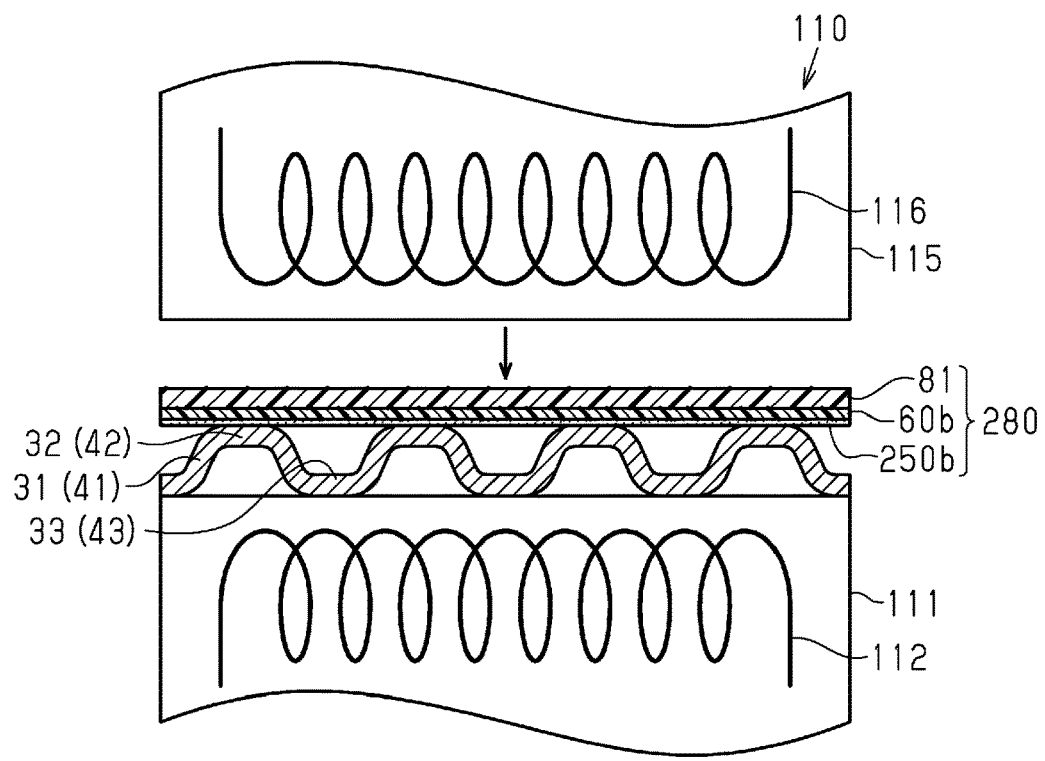
FIG. 12 is a cross-sectional view showing a state in which the thermal transfer sheet is mounted on the base.
Figure 13:
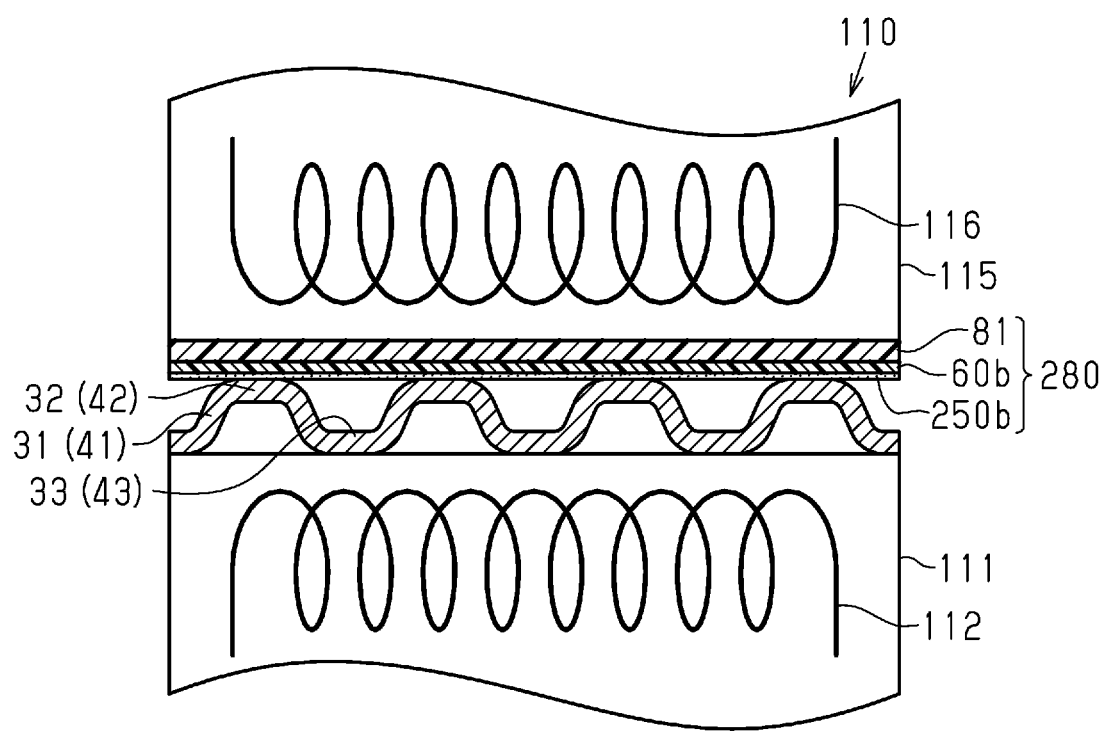
FIG. 13 is a cross-sectional view showing a state in which the resin paint and the conductive film are thermally transferred to the base.

Next, as shown in FIG. 12, the thermal transfer sheet 280 is mounted on the first projections 32 of the base 31 with the resin paint 250b directed downward. Afterwards, as shown in FIG. 13, the movable die 115 is lowered toward the fixed die 111. The fixed die 111 and the movable die 115 are used to pressurize and heat the base 31 and the thermal transfer sheet 280. This causes the resin paint 250b and the conductive film 60b to be thermally transferred to the top surfaces of the projections 32 to form the resin layer 250 and the conductive layers 60 on the top surfaces of the projections 32 as shown in FIG. 10. The first separator 230 is thus produced.

The operation of the second embodiment will now be described.

The thermal transfer sheet 280 in which the conductive paint 60a and the resin paint 250b are applied to the film 81 is used. This forms the resin layer 250 and the conductive layer 60 on each of the top surfaces of the projections 32, 42 of the bases 31, 41. The conductive layer 60 is arranged on each of the projections 32, 42 of the bases 31, 41 with the resin layer 250 located between the conductive layer 60 and the projection 32, 42. This allows the conductive layer 60 to be in closer contact with the top surfaces of the projections 32, 42 of the bases 31, 41. Thus, the formation of gaps between the conductive layer 60 and the front surfaces of the projections 32, 42 of the bases 31, 41 is limited (operation 4).

The advantages of the second embodiment will now be described.

The separator 220 of the second embodiment, the method for producing the separator 220, and the method for producing the thermal transfer sheet 280 according to the second embodiment provide the following advantage in addition to advantages (1) to (3) and (5) of the first embodiment.

(6) To produce the separator 220, the resin paint 250b including the thermosetting resin 250a is applied to the front surface of the conductive paint 60a of the film 81. This method provides operation 4 and thus reduces the contact resistance between the separator 220 and the power generation portion 11.

The above-described embodiments may be modified as follows. The above-described embodiments and the following modifications can be combined as long as the combined modifications remain technically consistent with each other.

The resin layer 50 may be arranged on two surfaces of each of the bases 31, 41.

The formation of the resin layer 50 may be omitted. In this case, the conductive layer 60 is directly formed on each of the top surfaces of the projections 32, 42 of the bases 31, 41. The formation of the resin layer 250 may also be omitted. In this case, the conductive layer 60 is directly formed on each of the top surfaces of the projections 32, 42 of the bases 31, 41.

The resin 63, which corresponds to the first resin, may be a thermosetting resin of a type that differs from the resin 50a, which corresponds to the second resin. The resin 63, which corresponds to the first resin, may be a thermosetting resin of a type that differs from the resin 250a, which corresponds to the second resin.

After only the raw materials of the conductive carbon materials 61 are ground using the grinding device 70, the ground conductive carbon materials 61, the conductive particles 62, the resin 63, and the solvent may be mixed.

The conductive paint 60a may be produced by preparing conductive carbon materials 61 having a given size in advance and mixing the conductive carbon materials 61, the conductive particles 62, the resin 63, and the solvent.

The conductive particles 62 may be ground using the grinding device 70.

The grinding device may be a device other than a jet mill. For example, a bead mill may be used.

In addition to or instead of graphite particles, another type of conductive carbon material such as carbon black may be used.

Instead of titanium nitride, another type of conductive particles such as titanium carbide or titanium boride may be used.

The base material 31.41 may be made of a metal plate other than stainless steel or titanium alloy. Examples of the metal include aluminum alloy and magnesium alloy.

The resins 63, 50a, 250a are not limited to epoxy resin and may be another type of thermosetting resin, such as phenol resin.

The invention claimed is:

1. A method for producing a separator for a fuel cell, the separator for the fuel cell including:
   a base including projections, the base being made of a metal plate; and
   a conductive layer including conductive carbon materials, conductive particles, and a thermosetting resin, the conductive layer being arranged on a top surface of each of the projections of the base such that the conductive layer is in contact with a power generation portion of the fuel cell,
   the method comprising:
   applying a conductive paint to a film to form a thermal transfer sheet, the conductive paint being produced by dispersing the conductive carbon materials and the conductive particles in an entirety of the resin; and
   pressurizing the thermal transfer sheet against the base and heating the thermal transfer sheet with the thermal transfer sheet in contact with each of the top surfaces of the projections, thereby thermally transferring the conductive paint to the each of the top surfaces of the projections and forming the conductive layer on the each of the top surfaces of the projections.

2. The method according to claim 1, wherein the conductive carbon materials are produced by grinding raw materials of the conductive carbon materials and mixing the ground conductive carbon materials, the conductive particles, and the resin.

3. The method according to claim 1, wherein
   the resin is a first resin, and
   before the conductive paint is thermally transferred to the each of the top surfaces of the projections to form the conductive layer on the each of the top surfaces of the projections, a resin layer including a thermosetting second resin is formed on an entirety of a front surface of the base opposing the power generation portion.

4. The method according to claim 1, wherein
   the resin is a first resin, and
   a resin paint including a thermosetting second resin is applied to a front surface of the conductive paint of the film.

* * * * *